United States Patent [19]

Volk et al.

[11] Patent Number: 4,795,247

[45] Date of Patent: Jan. 3, 1989

[54] PROCESS FOR FITTING A SPECTACLE FRAME AND DEVICE AND ADAPTIVE END PIECE FOR PERFORMING THE PROCESS

[75] Inventors: Stephan Volk, Miesbach; Joachim Baum, Rudersberg, both of Fed. Rep. of Germany

[73] Assignee: Eyemetrics-Systems AG, Chur, Switzerland

[21] Appl. No.: 88,868

[22] Filed: Aug. 24, 1987

[30] Foreign Application Priority Data

Apr. 3, 1987 [DE] Fed. Rep. of Germany ....... 3711248

[51] Int. Cl.[4] ............................................... G02C 13/00
[52] U.S. Cl. ......................................... 351/118; 29/20; 351/111; 351/178
[58] Field of Search ................. 351/111, 116, 118–119, 351/123, 178; 29/20, 564.2; 269/315, 319

[56] References Cited

U.S. PATENT DOCUMENTS

| | | | |
|---|---|---|---|
| 1,248,593 | 12/1917 | Arnold | 29/20 |
| 1,736,956 | 11/1929 | Simonds | 29/20 |
| 1,988,423 | 1/1935 | Rohrback | 351/123 |
| 2,558,829 | 7/1951 | Dolan | 269/315 |
| 2,919,128 | 12/1959 | Blattel et al. | 269/319 |

FOREIGN PATENT DOCUMENTS 3614637 11/1986 Fed. Rep. of Germany ...... 351/123

Primary Examiner—John K. Corbin
Assistant Examiner—Martin Lerner
Attorney, Agent, or Firm—Roth & Goldman

[57] ABSTRACT

A process for fitting temple end pieces onto the ends of the temples of a spectacle frame with a simplified manner of trimming the ends of the temples to the proper length and affixation of the temple end pieces thereto in the proper angle of rotation about the axes of the temples is disclosed together with apparatus for performing the process.

25 Claims, 2 Drawing Sheets

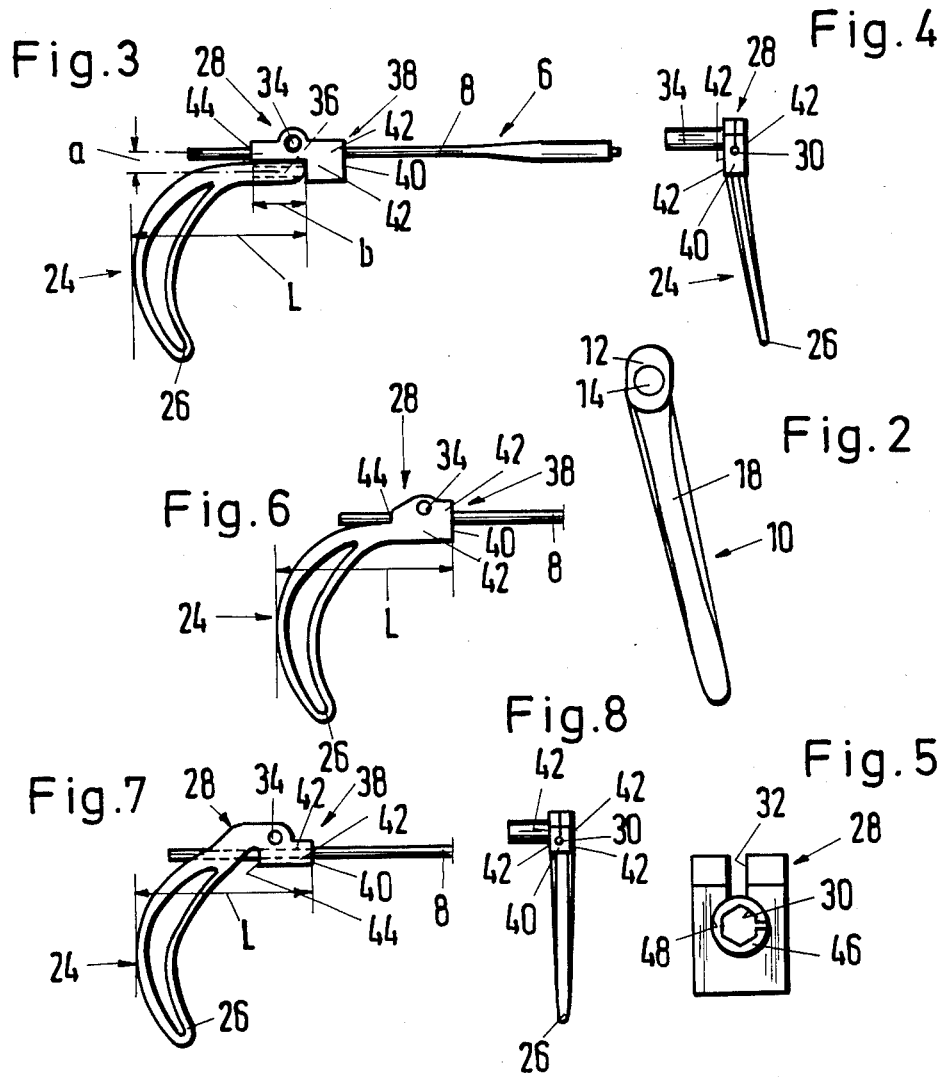

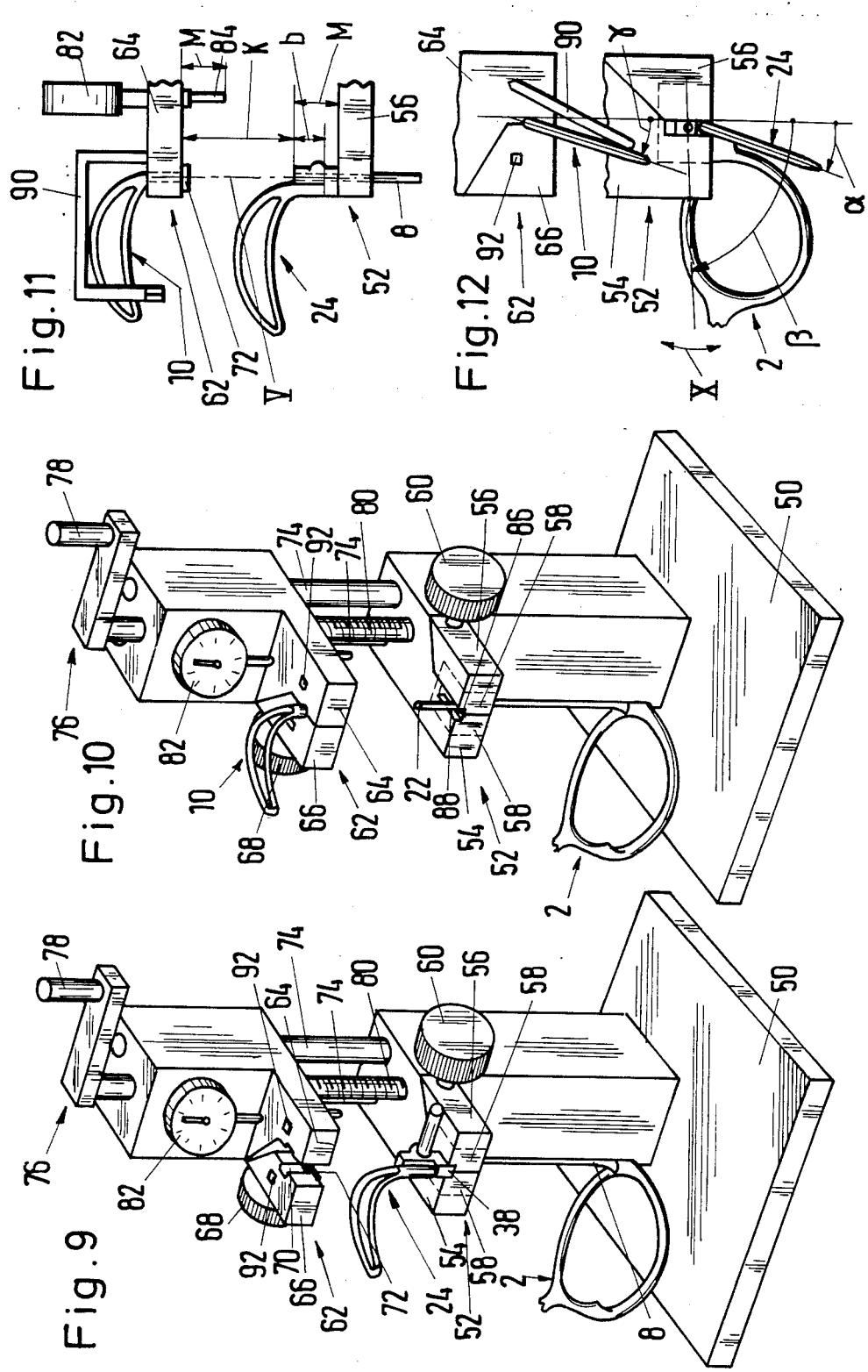

PROCESS FOR FITTING A SPECTACLE FRAME AND DEVICE AND ADAPTIVE END PIECE FOR PERFORMING THE PROCESS

FIELD OF THE INVENTION

The present invention relates to a process for fitting a spectacle frame and a means of performing this process.

PRIOR ART AND ITS CRITICISMS

German Utility Model No. 86 03 686 discloses a device and process that can be performed with it to serve the purpose of fitting a temple for a spectacle frame in such a manner that a temple end piece is inserted on the temple shaft and in this manner is permanently attached to the temple shaft. On the end of the temple facing away from the hinge a straight plug is formed, and the temple end piece, in addition to having a segment intended for fitting on or behind the ear of the spectacle wearer, also has an essentially straight segment equipped with a borehole to accommodate the plug. By trimming off the plug to a desired length and by setting a desired rotational position of the temple end piece relative to the plug axis prior to fitting this temple can be individually adapted to the geometry of the spectacle wearer's head.

In the device known in the art the first clamping mechanism has an opening which conforms precisely to the shape of the temple shaft, so that the temple shaft supported by the first clamping mechanism both assumes a position prescribed by the clamping mechanism in the direction of its axis and has a rotational position relative to the plug or temple axis as prescribed by the clamping mechanism. The second clamping mechanism of the device known in the art can be rotated around the axis of the device, which coincides with the axis of the plug and the axis of the borehole of the temple end piece and can be set at a prescribed value, so that by virtue of this setting the temple end piece can be brought into any desired rotational position relative to the axis of the plug and thus to the temple shaft before the two clamping mechanisms are moved relative to one another in the direction of the axis of the device. In the device known in the art it is necessary for the desired length and rotational position of the temple end piece to be known so that the second clamping device can be accordingly set and the plug can be then trimmed off accordingly. This procedure requires thus a measurement to the taken or a calculation to be made of the desired length of the temple and the desired rotational position and for the measurement or calculation result to be quantified. Such measurements and calculations, however, are mostly imprecise, and at best complicated and time-consuming.

OBJECT OF THE INVENTION

The present invention is based on the objective of further developing the process of this genre and the device of this genre to the extent that the determination of the desired rotational positions and the desired length of temple will be simplified, that especially the determination and transmittal of numerical values for the temple length and rotational position can be dispensed with.

SUMMARY AND ADVANTAGES OF THE INVENTION

In accordance with the present invention, the starting point is a spectacle frame not yet equipped with temple end pieces, which here will be referred to as the pre-spectacle frame. This pre-spectacle frame consists of a central portion, which will already be equipped with the spectacle lenses or may not already have these, the hinges for the temples and temple shafts of excessive length. From this pre-spectacle frame the spectacle frame will result as intended for the spectacle wearer and will be adapted to him individually. Thus the pre-spectacle frame is not so much as a sample, drawing from which the spectacle wearer selects a certain version, or a spectacle frame for performing measurements, with the use of which certain measurements are taken on the face or head of the spectacle wearer, but it is rather a case of elements of a pre-spectacle frame of the spectacles that actually will be turned over to the spectacle wearer.

On each of the two temple shafts of the pre-spectacle frame an adaptive end piece is attached so as to be detachable, which end piece is essentially identical in form to the temple end piece, which will be fitted and assembled. The pre-spectacle frame with the two adaptive end pieces is then placed on the spectacle wearer, and the position of each respective adaptive end piece on the temple shaft is altered until the adaptive end piece, owing to its contact with the skull and/or the ear of the spectacle wearer will provide for a correct and simultaneously comfortable fit of the pre-spectacle frame equipped with the adaptive end pieces. In this optimally fitted position each adaptive end piece will assume a certain rotational position relative to the axis of the temple shaft or to the axis of the plug and a certain axial position on the temple. Thereupon, on the pre-spectacle frame the adaptive end pieces are replaced by the temple end pieces of the finished spectacle frames, wehreby in this exchange care is taken that the temple end pieces are positioned in practically the same manner with respect to their axial position and also with respect to their rotational position as the adaptive end pieces were previously. For this purpose the two plugs are each trimmed off respectively to accord with the axial position of the adaptive end pieces. This preferably will be accomplished by severing the temple shaft ends on a shoulder of the adaptive end peices provided for this purpose. Alternatively, a mark could also be affixed on the temple shafts with respect to the axial position of the adaptive end pieces, whereby the temple shafts could then be trimmed off after the adaptive end pieces had been removed. In any event, for the purpose of ascertaining the desired length of temple and correspondingly trimming off the temple shafts, it is neither necessary to quantify any measurement results nor make a calculation.

For each temple a temple shaft of the pre-spectacle frame with the adaptive end piece affixed to it is inserted individually by means of the first clamping mechanism, and by means of the second clamping mechanism a temple end piece to be attached is inserted, whereby the axis of the borehole of the temple end piece and the axis of the temple shaft or axis of the plug coincide with and define the axis of the device. For this purpose the second clamping mechanism holds the temple end piece to be installed in a certain rotational position relative to the axis of the device. For this purpose, by suitable detents and/or by form-locking engagement provision can be made for preventing relative movement between the second clamping mechanism and the temple end piece.

On the first clamping mechanism two detents are formed, which are in contact with the opposing detents formed on the adaptive end piece when the temple shaft, together with the adaptive end piece, is inserted in the first clamping mechanism and snapped in. These detents and counter-detents are arranged in such a manner that they only come into contact with each other with a certain rotational position of the adaptive end piece with respect to the axis of the device and that the temple shaft is simultaneously snapped in. This means that in clamping the temple shaft together with the adaptive end piece into the second clamping mechanism the adaptive end piece will simultaneously be aligned in its particular rotational position. The detents of the first clamping mechanism, the counter-detents of the adaptive end piece and the second clamping mechanism are designed in such a manner that the predetermined rotational position of the clamped-in temple end piece and the particular rotational position of the adaptive end piece will coincide with one another, i.e. that the adaptive end piece and the temple end piece will live in a common plane.

Thereupon, the adaptive end piece is separated from the clamped-in temple shaft, and by means of the drive mechanism the two clamping mechanism are shifted relative to one another in the direction of the axis of the device far enough for the temple end piece to be installed will be shifted sufficiently far onto the correctly trimmed plug. The temple end piece thus installed will then have the same position relative to the temple shaft and with respect to its axial position that the adaptive end piece had previously assumed.

The above-described process will be carried out for each of the two temples of the spectacle frame.

As will be seen from the above description, the assembly of the temple end pieces with the desired rotational position relative to the axis of the plug will also not require any calculation of the rotational position, nor any quantification of a measurement result. Rather, this rotational position in the process according to the present invention is explored twice, viz. once on the head of the spectacle wearer, whereby each respective temple end piece is accordingly fixed in places, and a second time on the pre-spectacle frame equipped with the fitted adaptive end pieces by bringing the adaptive end piece into a certain rotational position with respect to the axis of the device, so that the temple shaft of the pre-spectacle frame will then assume a desired rotational position, differing from one spectacle frame to another, with respect to the temple end piece to be installed.

BRIEF DESCRIPTION OF THE DRAWINGS

Embodiments of the present invention are explained in the following with reference to the drawings. The drawings are as follows:

FIG. 1 an example of a spectacle frame fitted in accordance with the present invention;

FIG. 2 a front view of a temple end piece of the spectacle frame in accordance with FIG. 1;

FIG. 3 lateral view of a temple shaft of the spectacle frame in accordance with FIG. 1, onto which an adaptive end pieced has been attached in accordance with the preferred embodiment;

FIG. 4 a front view of the adaptive end piece in accordance with FIG. 3;

FIG. 5 a representation in enlargement of a variant of a coupling segment of the adaptive end piece in accordance with the FIG. 4;

FIG. 6 a second embodiment of an adaptive end piece in a representation similar to FIG. 3;

FIG. 7 a third embodiment of an adaptive end piece in a representation similar to FIG. 3;

FIG. 8 a front view of the adaptive end piece in accordance with FIG. 7;

FIG. 9 a view in perspective of an embodiment of the device for fitting a spectacle frame in an initial operating condition;

FIG. 9a an exploded view of the adaptive end piece and left hand lower clamping jaw of the device seen in FIG. 9;

FIG. 10 a representation corresponding to FIG. 9 of the device in a second operating condition;

FIG. 11 a lateral view in section of the device in accordance with FIGS. 9 and 10 for the purpose of explaining the manner of operation; and FIG. 12 a top view of FIG. 11, whereby the upper of two clamping devices shown in FIG. 11, however, are depicted as being transposed to the right as seen in FIG. 11 (upward in FIG. 12).

DESCRIPTION OF THE PREFERRED EMBODIMENTS

The spectacle frame shown in FIG. 1 is comprised of a center portion 2, on the flanges of which two temples 6 are hinged with the aid of hinges 4. Each temple 6 consists of a temple shaft 8 and a temple end piece 10, which is attached to the temple end piece on the end of the temple end piece 10 facing away from the hinge 4. Each temple end piece 10 has an essentially straight first segment 12, in which a borehole 14 (see FIG. 2) has been formed and a second segment 16 intended for reposing against the skull or behind the ear of the spectacle wearer. In the embodiment shown of the spectacle frame this second segment 16 consists of two elements, viz. of a softer, band-shaped element 18 and an more rigid element 20 supporting the band-shaped element 18.

On each respective end of each temple shaft 8 facing the respective temple end piece 10 a plug 22 is formed, which is inserted into the borehole 14. Through this means a sufficiently firm connection is achieved between the respective temple shaft 8 and the temple end piece 10 assigned to it, whereby within the framework of the present description it is not necessary to furnish an exact depiction of this connection of plug 22 and borehole 14. It is only of importance for this connection to be accomplished by inserting the plug 22 into borehole 14.

In order for the spectacle frame described in the above to be able to be worn safely and simultaneously comfortably by the spectacle wearer, it will be useful for each temple to have a temple length conforming to the individual geometry of the head of the spectacle wearer, and, in addition, for each of the two temple end pieces 10 to have an individually fitted inner inclination. By inner inclination the extent is meant here in which the lower ends of the temple end pieces 10 are rotational around the axis of its concomitant plug 22 toward the skull of the spectacle wearer. The individually fitted length of temple is termed here as the desired length of temple and the individually adapted inner inclination here is termed as the desired rotational position of the temple end piece relative to the axis of the plug.

In the following a description is given with the use of examples of how and with what means the described spectacle frame can be fitted in such a manner that its temples will have the desired length and its temple end pieces the desired rotational position.

For this purpose the assumption will be made in the following explanation of a so-called pre-spectacle frame, consisting of the center portion 2 (with spectacle lenses or without) of the spectacle frame to be fitted and temples 6, which have not yet been equipped with temple end pieces 10 and the shafts of which temples 6, by comparison to the completely fitted spectacle frame, will have an excess length. Apart from this consideration, the temple shafts 8 are elements of the completely fitted and assembled spectacle frame.

To ascertain the desired length of temple and the desired rotational position of each temple end piece, an adaptive end piece 24 is attached to each temple shaft of the pre-spectacle frame, of which adaptive end piece 24 a preferred embodiment is shown in the FIGS. 3 and 4. The adaptive end piece 24 is comprised of an ear reposing segment 26, having a shape and design which coincides with the second segment 16 of the temple end piece 10 to be installed since the ear reposing segment 26 is intended to demonstrate the same behavoir when the pre-spectacle frame equipped with adaptive end pieces 24 is adapted to the spectacle wearer and the second segment 16 of the completely fitted and assembled spectacle frame.

In addition, the adaptive end piece 24 is comprised of a coupling segment 28, which serves the purpose of detachably connecting the ear reposing segment 26 to the respective temple shaft 8. In the coupling segment 28 a cylindrical through-borehole 30 is formed, which has essentially the same position relative to the ear reposing segment 26 as the borehole 14 of the temple end piece 10 does to its segment 16. In the coupling segment 28 a slot 32 has also been formed, which extends in the direction of the axis of the through-borehole and which connects the through-borehole with the outer side of the coupling segment 28, so that the slot 32 and thus the through-borehole 30 can be constricted by means of a clamp screw 34 acting on both sides of the slot 32, in order to clamp the coupling segment 28 tight on the temple shaft and thus fix it in place.

In the preferred embodiment of the adpative end piece shown in FIGS. 3 and 4 the ear reposing segment 26 and the coupling segment 28 are formed as separate elements. The coupling segment 28 has a prong 36 parallel to the through-borehole 30. A temple end piece 10 is inserted onto the prong 36, i.e. an element identical in every respect to the temple end piece to be installed. In this manner provision is made with very little outlay for the form and shape of the ear reposing segment 26 to coincide with the form and shape of the second segment 16. The connection accomplished by means of the prong 36 between the coupling segment 28 and the ear reposing segment 26 is sufficiently firm to prevent any rotation of the ear reposing segment 26 around the prong 36 when the adaptive end piece 24 is put to its intended use.

On the end of the coupling segment 28 as seen on the right in FIG. 3 this segment reflects a rectangular-shaped head 38, which is bordered by a front side extending perpendicular to the axis of the through-borehole and thus to the temple shaft, two lateral surfaces parallel to one another and to the axis of the through-borehole and a top side and bottom side. The forn side forms an end or shoulder 40, the function of which will be explained below. Each of the two lateral surfaces preferably has at least two outwardly extending projections 42, the function of which will also be described below. These projections 42 on either of the lateral sides do not stand in especial contrast to the remaining areas of the respective lateral surfaces; it is solely of importance that are formed by various areas of the respective lateral surfaces. On the end of the coupling segment 28 facing away from the shoulder 40 a second shoulder 44 is formed. The second shoulder 44 surrounds the through-borehole; its location on the coupling segment is a measure for the desired length of temple once the adaptive end piece 24 has been brought into the properly fitted position on the temple shaft 8, as will be explained below. In the adaptive end piece in accordance with FIG. 3 and 4 the ear reposing segment 26—as already mentioned—is constituted by a complete temple end piece 10 with the length L. Going from the front end of the temple end piece (to the right as seen in FIG. 3), the borehole 14 extends via a length b, across which the prong 36 also extends. The second shoulder 44 is located—if regarded in the direction of the borehole axis—in the same position as the base of the borehole in the temple end piece, i.e. at the interval b from the front end of the temple end piece constituting the ear reposing segment 26. If—after the adaptive end piece has been correctly fitted—the temple shaft of the second shoulder 44 is trimmed off, it will thus have exactly the correct length for insertion all the way to the base of the borehole 14 of the temple end piece to be installed.

The second shoulder 44 will in any event not have to be formed at the location of the coupling segment 28 as explained in the above. For example, provision can be made for the correctly trimmed-off plug of the temple 8 not to be completely inserted into the borehole 14 of the temple end piece 10, but, for example, to end 2 mm short of the base of the borehole 14. In this event the second shoulder 44 will be formed further to the right (as seen in FIG. 3) by the above-mentioned extent (2 mm). In addition, the assumption is also made in the above that the trimming off of the temple shaft 8 will be made exactly in the plane of the second shoulder 44. But this is also not a necessary characteristic. For example, because of the tool used for trimming off the temple shaft 8, it can be prescribed that the section is to occur at a certain interval, e.g. 1 mm, from the shoulder 44. In this instance the second shoulder 44 will be formed further to the right (as seen in FIG. 3) by the stated interval (1 mm). Common to both the above described possibilities for the arrangement of the second shoulder 44 is the fact that their location on the coupling segment 28 is a measure for the desired length of temple and defines the length of the temple shaft 8 by which it will have to be trimmed off after the fitting process with the aid of the adaptive end piece, so that the temple will have the proper length of temple.

One variant of the preferred embodiment of the adaptive end piece as depicted in FIGS. 3 and 4 is shown in section in FIG. 5. In this variant the through-borehole 30 is formed in a longitudinally slotted collar 46, which is formed in a second through-borehole 48 in the coupling segment 28. For this purpose, the collar 46 is situated in the second through-borehole 48 so as to be rotatable. This design of the first through-borehole 30 in the rotatable collar 46 will be of especial advantage when the plug 22 and the temple shaft 8 have a non-round profile, for example, a hexagonal profile, so that such a plug, despite its not being round, could be rotated without hindrance in the coupling segment 28 and fixed in placed in any rotational position desired, without having to undertake any change of the previously assumed rotational position when the fixing in place is accomplished.

FIG. 6 shows a second embodiment of the adaptive end piece 24. The same reference numerals are used for its elements that coincide with the analogous elements of the preferred embodiment; these elements will not be discussed anew. Rather, in the following only the differences to the preferred embodiment will be indicated.

In the second embodiment of the adaptive end piece the coupling segment 28 and the ear reposing segment 26 are formed in one piece with one another. Special measures for connecting the ear reposing segment 26 and the coupling segment 28, as seen in the preferred embodiment in the form of a prong 36, can thus be dispensed with. The length of the adaptive end piece 24 is the same as the length L of the temple end piece 10 to be installed. In the pre-spectacle frame with the adaptive end piece in accordance with the preferred embodiment the ear reposing segments 26, even if the adaptive end pieces have been correctly fitted, will not occupy exactly the same position which the second segments 16 will have relative to the plug 22 with the completely fitted and assembled spectacle frame in place. This is because a difference in position will occur because of the fact that the coupling segment 28 keeps the ear reposing segment 26 too far down (as seen in FIG. 3) by the amount of the interval between the axes of the prong 36 and the temple shaft. This interval is indicated in FIG. 3 as "a". The effect of this difference in position on the determination of the desired length of temple and the desired rotational position is, for all practical purposes, mainly without any significance. If this altogether slight effect is desired to be reduced even further, the second embodiment in accordance with FIG. 6 will be of advantage to the degree that in it the difference in position as described in the above is slighter than is the case in the preferred embodiment.

This difference in position is eliminated in the third embodiment in accordance with FIGS. 7 and 8, in which the first through-borehole 30 in the coupling segment 28 has exactly the same position relative to the ear reposing segment 26 as does the borehole 14 of the temple end piece 10 to be installed has to the second segment 16. In the third embodiment the ear reposing segment 26 and the coupling segment 28 once again are formed in one piece with one another. Owing to the described position of the through-borehole 30 in the coupling segment 28, the second shoulder 44 is not—as is the case in the embodiments in accordance with FIG. 3 through 6—formed at the back end of the through-borehole 30, but rather a recess opening downward is formed in the coupling segment 28, the right (as seen in FIG. 7) flank of which recess constitutes the second shoulder 44.

Otherwise, the third embodiment conforms with the second embodiment. For all embodiments elements held in common, once again, will be indicated with the same reference numerals; these elements will not be explained anew.

The pre-spectacle frame with the two adaptive end pieces 24 is fitted on the spectacle wearer. This means that the two adaptive end pieces are brought into such an axial position on the temple shafts 8 and such a rotational position that the ear reposing segments 26 can provide for a secure fit of the pre-spectacle frame, while simultaneously, however, not causing any pressure points on the head or ears of the spectacle wearer, i.e., while providing the highest possible comfort in wearing. Following this correct adaptation of the adaptive end pieces, the desired lengths of temple will be furnished through their axial positions on the temple shafts 8 and the desired rotational positions through their rotational positions relative to the axes of the temple shafts 8. The adaptive end pieces 24 are fixed in place in their correctly fitted positions with the aid of the respective clamping screw 34. In conjunction with this fitting of the adaptive end pieces the two temple shafts are trimmed off in the manner already described in the above. This trimming off can take place at any point desired, as long as the adaptive end pieces are still fixed in place in their fitted positions on the temple shafts 8. If one of the marking points corresponding to the second shoulder 44 is affixed on the temple shafts, this trimming off can take place even after the adaptive end pieces 24 are removed from the temple shafts 8, because these markers will then determine the length of shaft to which trimming must be made.

In the following a device will be explained, with the aid of which the temple end pieces 10 are installed in such a manner that the temples will have the desired length of temple and the temple end pieces the desired rotational position. In the explanation of the procedural steps performed with this device the assumption will be made in the following that the trimming off of the temple shafts 8 will take place as the step next after the fitting of the adaptive end pieces.

The device shown in FIGS. 9 and 10 in two states of operation is comprised of a base plate 50, to which a first clamping mechanism 52 is permanently attached. The first clamping mechanism 52 has two clamping jaws, viz. a clamping jaw 54 as a fixed part of the device and a movable clamping jaw 56. The two clamping jaws 54 and 56 jointly limit a straight, cylindrical reception aperture intended for clamping in the temple shaft 8 (see FIG. 10). In the region of the reception aperture the two clamping jaws 54 and 56 have inserts 58 made of elastomer material to prevent uneven pressures and tensions. The two clamping jaws 54 and 56 can be tightened toward one another, by means of, for example, a tightening screw 60.

The device furthermore has a second clamping device 62, which is situated vertically above the first clamping mechanism 52. The second clamping mechanism 62 is comprised of a clamping jaw 64 as a fixed part of the device and a movable clamping jaw 66. The two clamping jaws can be tightened toward one another by means of a tightening screw 68. The two clamping 64 and 66 jaws jointly border a straight reception aperture 70 for the first segment 12 of the temple end piece 10 having the borehole 14. In the area of the reception aperture 70 the two clamping jaws 64 and 66, similarly to the clamping jaws 54 and 56, manifest inserts 67 made of elastomer material. The reception aperture 70 has a non-round profile, which corresponds to the profile of the first segment 12 of the temple end piece 10 to be accommodated and which, for example, is shaped as an elongated oval, as may be seen in FIG. 2. In the lower (as seen in FIGS. 9 and 10) end of the reception aperture 70 an axial detent 72 is situated, on which the front end of the first segment 12 of the temple end piece 10 can repose, so that by virtue of this axial detent 72 the position of the clamped-in temple end piece 10 in the second clamping mechanism is defined in the direction of the axis of the reception borehole 70.

The reception borehole 70 and the reception borehole of the first clamping mechanism 52 are designed in such a manner that the axis of the reception borehole of the first clamping mechanism and the axis of the borehole 14 of the temple end piece 10 clamped into the second clamping mechanism coincide with one another and jointly form an axis V of the device (see FIG. 11), which in addition the axis of the temple shaft 8 will coincide if it is clamped into the first clamping mechanism 52.

The two clamping mechanisms 52 and 62 are movable towards one another in the direction of the axis V of the device, whereby this movement is guided by two guiding columns 74 permanently attached to the first clamping mechanism 52 and on which the second clamping mechanism 62 can be shifted. In addition, the device has a drive mechanism 75, which in the embodiment shown has a threaded spindle that can be rotated by means of a crank 78. By turning the crank 78 the second clamping mechanism 62 can be moved upward or downward. It will be obvious that both the drive mechanism 76 and the means for guiding the movement between the two clamping mechanisms can have a form other than the one depicted. For instance, a toggle joint drive or a cog rack drive can also be considered as possibilities.

A length measuring gauge 82 is attached to the second clamping mechanism 62, the scanner 84 of which gauge protrudes in the direction toward the first clamping mechanism 52. The length measuring gauge 82 makes it easier to observe the shifting of the second clamping mechanism 62 relative to the first while the temple end piece 10 is being inserted on the plug 22.

As may be seen in FIG. 10 especially, a groove with a rectangular profile in the inserts 58 and extending perpendicular to the axis V of the device is formed on the first clamping device 52 on its upper side. The even base of this groove forms a generally horizontally extending surface or shoulder 86, through the longitudinal center of which the axis V of the device extends vertically. This shoulder 86 is intended for the purpose of working together with the first end or shoulder 40 of the adaptive end piece 24, whereby the first shoulder 40 of the adaptive end piece will constitute a countershoulder to the shoulder 86.

As best seen in FIG. 9a, spaced vertically extending edges of the clamping jaws 54, 56 comprise generally smooth surfaces which extend parallel to the axis V of the device. Each of these edges is provided with a pair of recesses 88 of which only one is depicted in FIG. 10. These recesses 88 are pointed to receive the projections 42 on the adaptive end piece to provide precise positioning thereof in the clamping jaws 54, 56. It will be appreciated, however, that the mating projections 42, and recesses 88 are not essential since the rectangular cross section of head 38 is of complementary shape to that of the groove between the changing jaws 54, 56.

In the device described in the above, the pre-spectacle frame is rigged with the fitted adaptive end pieces 24 following the trimming-off of the plugs 22 and temple shafts 8 in the manner shown in FIG. 9. With the first clamping mechanism 52 in the open position, the shoulder 40 of the adaptive end piece 24 is brought to rest against the shoulder 86. Simultaneously, the projections 42 are brought to rest against the aligned recesses 88 on the one lateral surface of the head 38 of the adaptive end piece 24. If the second clamping mechanism is then closed, the rectangular-shaped head 38 is precisely clamped and positioned in the clamping jaws 54, 56, while the temple shaft 8 is clamped into the aligned reception borehole. Because of the rectangular cross section of head 38 and the recesses 88 of the first clamping mechanism 52 and the projections 42 (counterdetents) of the adaptive end piece 24 being in contact with one another, the adaptive end piece 24 in the first clamping mechanism can only assume one predetermined position with respect to the axis V of the device, as may be seen especially in FIG. 12. This means in other words, that during the clamping-in of the adaptive end piece 24 into the first clamping mechanism 52 the adaptive end piece 24 is oriented in this particular position. Since the adaptive end piece 24 is fixed in place on the temple shaft 8, with this orientation the temple shaft 8 and the center portion 2 of the spectacle frame connected to it are also rotated around the axis V of the device, as is indicated by a double arrow X in FIG. 12. The angle $\alpha$ describing the rotational position of this adaptive end piece with respect to the axis V of the device (see FIG. 12) is prescribed by the geometry of the adaptive end piece 24 and the first clamping mechanism. Changeable, however, will be the angle $\beta$, which describes the rotational position of the center portion 2 of the spectacle frame with respect to the axis V of the device. This orients itself according to the position of the inner inclination of the ear reposing segment 26 as assumed during the fitting process.

From this above description it should be clear that the function of the rotational cross section of head 38 and, if provided, of the recesses 88 and of the projections 42 (counter-detents) consists of orienting the adaptive end piece 24 in the device in the determined rotational position and preventing both vertical and horizontal sliding movement of the adaptive end piece in the clamping jaws 54, 56.

The shoulder 86 works in conjunction with the shoulder 40 (counter-shoulder) in this process for positioning the temple shaft 8 and the adaptive end piece 24 in the direction of the axis V of the device in a defined position. This makes it easier to shift the temple end piece 10 to be installed, but is not necessary for the temple end piece to be shifted at all.

After the clamping-in of the temple shaft 8 with the adapting end piece 24 attached to it has been performed in the manner described in the above, the adaptive end piece 24 is detached from the temple shaft 8 and removed, so that the state of operation depicted in FIG. 10 is the result. It will be understood that the frictional forces operative between the adaptive end piece 24 and the two clamping jaws 54 and 56 must be low enough for it to be at all possible to remove the adaptive end piece 24 from the plug 22. At the same time, however, the frictional hold between the temple shaft 8 and the clamping jaws 54 and 56 must be great enough that there will be no shifting toward the direction of the axis V of the device in the first clamping mechanism 52 while the adaptive end piece 24 is being removed from the plug 22 of the temple shaft 8.

In conjunction with this, the temple end piece 10 to be installed, which previously had been clamped into the second clamping mechanism 62 is inserted onto the plug 22. In order for the temple end piece 10 to have the desired rotational position, it must have the same rotational position in the device as with respect to the axis V of the device as previously the adaptive end piece 24 had with respect to the axis V of the device. This means that the angle γ drawn in the FIG. 12 to describe the rotational position with respect to the axis of the device of the temple end piece to be installed must coincide with the angle α. In other words, this means that the temple end piece 10 to be installed and the adaptive end piece 24 must lie in the same plane enclosing the axis V of the device. (A slight deviation of this requirement can be caused by the interval "a" as described above in conjunction with the adaptive end pieces in accordance with the FIGS. 6 through 8. Such a deviation, however, is usually admissible from a practical standpoint.

Provision is made by the formation of the reception aperture 70 for the identical rotational position as required above of the temple end piece 10 to be installed and the adaptive end piece 24 with respect to the axis V of the device, which reception aperture 70 embraces the first segment 12 of the temple end piece 10 in form-locking, and the recesses 88 working in conjunction with the projections 42 (counter-projections), which prevent slipping. A rotational position detent 90, which is installed on the second clamping mechanism, can serve by itself or in addition for the exact alignment of the temple end piece 10 to be installed in the predetermined rotational position.

The insertion of the temple end piece 10 is explained in the following, with reference to FIG. 11, whereby FIG. 11 still shows the adaptive end piece 24 in the clamped-in state, this to be removed before the insertion can take place. By means of the driving mechanism 76 the second clamping mechanism is first moved downward by the extent of K. In the position thus reached, the opening of the borehole 14 of the temple end piece 10 will be found at the end of the trimmed-off plug 22. Since the scanner 84 of the length measurement gauge 82 protrudes downward across the lower side of the second clamping mechanism serving as reference plane by the extent of M, which coincides with this stretch, around which the trimmed-off plug 22 protrudes upward across the upper side of the first clamping mechanism 52 serving as a further reference plane, the scanner comes into contact at the same time with the additional reference plane. With a further downward movement of the second clamping mechanism 62, the desired depth of insertion for the plug 22 into the borehole 14 can be observed on the length measurement gauge. This will be, for example, equal to the entire borehole length of "b". Heat may be applied to the plug and/or to the temple end piece of during the insertion.

Following this, the two clamping mechanism will then be opened and the spectacle frame can be removed from the device. The temple end piece 10 will assume the desired rotational position on the temple shaft 8; the temple 6 will have the desired length of temple. Since those measures which were responsible for a sufficiently firm connection between the plug 22 and the borehole 14 are not an object of the present invention, they are not discussed here.

The installation of the temple end piece 10 on the temple shaft 8 as described in the above is carried out in the identical manner for the other of the two temples, once it has been carried out for one of the two temples. For this reason it is useful for the recesses 88 to be shaped symmetrically left and right (as seen in FIG. 12). Two insertion apertures 92 are provided as seen in FIG. 9 so that rotational position detent 90 can fulfill its function for each of the two temples 6 of the spectacle frame.

The insertion of the temple end piece 10 onto the plug 22 by the extent desired need not be performed in the manner described in the above. For example, this can occur by a process in which the temple end piece 10 is inserted until the free end of the plug strikes against the base of the borehole 14. A further possibility consists of inserting the temple end piece 10 until its free end, or lower end as seen in FIG. 11, encounters the first clamping mechanism 52, specifically runs against its shoulder 86. This process will be useful especially in conjunction with the adaptive end pieces in accordance with FIGS. 6 through 8, the length L of which coincides with the temple end piece 10. Finally, another possibility is afforded by moving the two clamping devices 52 and 62 toward one another until they rest against one another indirectly or directly.

For fitting a spectacle frame having a center portion, two temples and temple end pieces inserted on the temple ends, adaptive end pieces are placed on the temple shafts prior to inserting the temple end pieces, the form of which adaptive end pieces largely coincides with the temple end pieces to be installed. With the use of these adaptive end pieces the spectacle frame is fitted to the spectacle wearer, whereby the adaptive end pieces are brought into the proper axial position and rotational position with respect to the temple shafts. Conforming to the positions of the fitted adaptive end pieces, the temple shafts are trimmed off. Each temple shaft is clamped with an adaptive end pieced attached to it into a device, whereby a detent mechanism of the device and a counter-detent mechanism of the temple end piece are responsible for ensuring that the adaptive end piece assumes a predetermined rotational position with respect to the axis of the device. The device holds the temple end piece with this same predetermined rotational position, which temple end piece is inserted by a defined extent onto the temple shaft after the adaptive end piece has been removed from the temple shaft. On the completed and assembled spectacle frame the temples will have the desired length of temple as ascertained by fitting the adaptive end pieces. The temple end pieces will have the rotational position with respect to the axes of the shafts as ascertained by fitting the adaptive end piece and conveyed by means of the device and desired inner inclination.

We claim:

1. A method of fitting a spectacle frame, said frame comprising a center portion and two temples connected to the center portion with hinges, each temple comprised of a temple shaft having an end and a longitudinal axis, and a temple end piece at the end of said shaft, said temple end piece having a borehole therein which receives the end of said shaft, and in which each temple end piece is brought into a desired rotational position relative to the axis of the shaft, characterized by the steps of, prior to connecting each temple end piece to the associated shaft, attaching an adaptive end piece to said associated temple shaft in a position to conform to geometry of an ear and head of a spectacle wearer, fixing said adaptive end piece in said position, trimming off the ends of said temple shafts at length which correspond with intended final positions of the adaptive end pieces, retaining said temple end piece to be installed in a rotational position relative to its associated temple shaft while said adaptive end piece is still fixed on the shaft such that the temple end piece to be installed and the associated adaptive end piece are disposed in parallel planes each aligned with the axis of the shaft to which said end piece is to be affixed and inserting the ends of the shafts into the boreholes of the associated temple end pieces after the adaptive end pieces have been removed from the temple shafts.

2. The method of claim 1, characterized by the step of heating the shaft end or the temple end piece while inserting the shaft into the borehole of the temple end piece.

3. Device for fitting a spectacle frame in accordance with the process according to claim 1 comprising: a first clamping mechanism having a clamping axis for releasably holding one of the two temple shafts of a pair of spectacles aligned with said clamping axis of the first clamping mechanism, a second clamping mechanism having a clamping axis which coincides with the clamping axis of the first clamping mechanism for releaseably holding the temple end piece to be installed in a predetermined rotational position relative to said temple shaft, a drive mechanism for relatively moving the two clamping mechanisms in the direction of the axis of the device, said first clamping mechanism being capable of holding the temple shaft in any desired rotational position relative to said axis, said first clamping mechanism having first positioning means thereon intended for contact with second mating positioning means on an adaptive end piece detachably affixed to said temple shaft in the intended rotational position relative to the axis of said shaft, and said second clamping mechanism having third positioning means thereon for positioning the temple end piece in the same rotational position relative to said axis as said adaptive end piece the rotational position of the adaptive end piece with respect to the axis of the device, and that the second clamping mechanism (62) on the one hand and the detents (88) of the first clamping mechanism on the other hand are arranged and formed in such a manner that the predetermined rotational positions of the temple end piece (10) and the rotational position of the adaptive end piece (24) coincide with one another.

4. Device according to claim 3, wherein said first positioning means comprises a shoulder on the first clamping mechanism and said second positioning means comprises a counter-shoulder on the adaptive end piece.

5. Device according to claim 3 wherein the first clamping device has two clamping jaws that can be tightened toward one another and that jointly bound a cylindrical reception aperture for the temple shaft.

6. Device according to claim 5, further comprising inserts of elastomeric material in the region of the reception aperture.

7. Device according to claim 3 wherein said first positioning means comprises at least two recesses formed in a vertically extending surface which is spaced from the axis of the device.

8. Device according to claim 7, further comprising a groove having a rectangular cross section on the first clamping mechanism, said groove extending normal to the axis of the device, the base of which groove comprising a shoulder and said first positioning means comprising recesses on at least one sidewall of said groove.

9. Device according to claim 4, characterized by the fact that a plurality of recesses and the shoulder are located on the side of the first clamping mechanism facing the second clamping mechanism.

10. Device according to any one of claims 3 through 7, characterized by the fact that the second clamping mechanism has two clamping jaws that can be tightened toward one another, which, together bound a straight reception aperture for the temple end piece portion having the borehole therein.

11. Device according to claim 10, further comprising an insert of elastomeric material on each of the clamping jaws in the region of the reception aperture.

12. Device according to claim 10, characterized by the fact that the reception aperture is non-round.

13. Device according to claim 10, wherein said third positioning means comprises a feeler gage on the second clamping device against which the temple end piece rests in its particular rotational position.

14. Device according to claim 10, wherein the second clamping mechanism has an axial detent, which determines the position of the temple end piece in the second clamping mechanism.

15. Adaptive end piece for fitting a temple end piece onto the temple of a spectacle frame according to the process according to claim 1, comprising: an ear reposing segment having the form and shape of a corresponding segment of the temple end piece to be installed, a coupling segment connected to the ear reposing segment, and a straight through-borehole having an axis and the same relative position as the borehole of the temple end piece to be installed relative to the corresponding segment of the latter, and a mechanism for detachably affixing the temple end in the through-borehole, and at least two projections on the coupling segment, which projections assume certain positions with respect to the ear reposing segment in the circumferential direction of the through-borehole.

16. Adaptive end piece according to claim 15, characterized by a shoulder on the coupling segment, extending essentially transversely to the axis of the through-borehole.

17. Adaptive end piece according to claim 15 or 16, characterized by the fact that the coupling segment and the ear reposing segment are elements made separate from one another, and further comprising a prong, on which the ear reposing segment is inserted.

18. Adaptive end piece according to claim 15 or 16, wherein said mechanism for detaching fixing comprises a clamping screw having a free end which protrudes into the through borehole.

19. Adaptive end piece according to claim 15 or 16, characterized by a slot in the wall of the coupling segment surrounding the through-borehole, said slot extending in the direction of the axis of the through-borehole and that the fixing mechanism is a clamping screw, which acts on either side of the slot.

20. Adaptive end piece according to claim 15 or 16, characterized by a collar having a the through-borehole formed therein said collar being rotationally inserted into a second through-borehole of the coupling segment.

21. Adaptive end piece according to claim 15 or 16, characterized by a second shoulder surrounding the through-borehole, the location of which shoulder on the coupling segment is a measure for the desired length of temple.

22. Adaptive end piece according to claim 16, characterized by the fact that the coupling segment and the ear reposing segment are formed together in one piece.

23. Adaptive end piece according to claim 22, characterized by the fact that the axis of the through-borehole coincides with the axis of the borehole of the temple end piece to be installed.

24. Adaptive end piece according to claim 16, characterized by the fact that the two projections are formed on a flat surface, which extends parallel to but spaced from the axis of the through-borehole.

25. Adaptive end piece according to claim 24, characterized by the fact that a rectangular-shaped head is formed on the coupling segment, the front side of which forms a shoulder, and said projections are formed on at least one of the lateral surfaces of the head.

* * * * *